United States Patent Office 2,798,079
Patented July 2, 1957

2,798,079

CONDENSATION OF AROMATIC HYDROCARBON DERIVATIVES WITH CARBOHYDRATES AND RELATED MATERIALS

Carl B. Linn, Riverside, Ill., assignor to Universal Oil Products Company, Des Plaines, Ill., a corporation of Delaware No Drawing. Application December 29, 1953,
Serial No. 401,068

13 Claims. (Cl. 260—345.7)

This application is a continuation-in-part of my copending application Serial No. 212,839, filed February 26, 1951, now abandoned.

This invention relates to a process for interacting aromatic hydrocarbon derivatives with carbohydrates and materials closely related to carbohydrates. The process relates more particularly to the condensation of simple sugars, their desoxy, and omega-carboxy derivatives, compound sugars, or oligosaccharides, and polysaccharides, with aromatic hydrocarbon derivatives in the presence of a hydrogen fluoride catalyst.

An object of this invention is to produce organic materials suitable per se or as intermediates in the manufacture of detergents, pharmaceuticals, explosives, gelling agents, surface coatings, resins, and oxidation inhibitors by condensing aromatic hydrocarbon derivatives with carbohydrates or with carbohydrate derivatives.

One embodiment of this invention relates to a process comprising condensing an aromatic hydrocarbon derivative with a carbohydrate in the presence of a hydrogen fluoride catalyst, and recovering the resultant condensation products.

Another embodiment of this invention relates to a process which comprises condensing a nitroaromatic compound with a carbohydrate in the presence of a hydrogen fluoride catalyst, and recovering the resultant condensation products.

Still another embodiment of this invention relates to a process which comprises condensing a sulfoaromatic compound with a carbohydrate in the presence of a hydrogen fluoride catalyst, and recovering the resultant condensation products.

Still another embodiment of this invention relates to a process which comprises condensing an aminoaromatic compound with a carbohydrate in the presence of a hydrogen fluoride catalyst, and recovering the resultant condensation products.

Another embodiment of this invention relates to a process which comprises condensing a hydroxyaromatic compound with a carbohydrate in the presence of a hydrogen fluoride catalyst, and recovering the resultant condensation products.

Still another embodiment of this invention relates to a process which comprises condensing a haloaromatic compound with a carbohydrate in the presence of a hydrogen fluoride catalyst, and recovering the resultant condensation products.

A still further embodiment of this invention relates to a process which comprises condensing an aromatic carboxylic acid with a carbohydrate in the presence of a hydrogen fluoride catalyst, and recovering the resultant condensation products.

A further embodiment of this invention relates to a process which comprises condensing an aromatic aldehyde with a carbohydrate in the presence of a hydrogen fluoride catalyst and recovering the resultant condensation products.

Still another embodiment of this invention relates to a process which comprises condensing an aromatic ketone with a carbohydrate in the presence of a hydrogen fluoride catalyst, and recovering the resultant condensation products.

I have found that useful water-insoluble condensation products and also water-soluble condensation products are formed by reacting aromatic hydrocarbon derivatives with carbohydrates and related substances in the presence of a hydrogen fluoride catalyst. These reactions may be carried out in steel equipment or other suitable apparatus lined with silver, copper, and certain alloys such as Monel metal and the like. This treatment may be effected at temperatures of from about —40 to about 100° C., and preferably at temperatures of from about —10 to about +50° C. The pressure at which the reaction is carried out will vary with the reaction temperature used, and the mol fractions of reactants and hydrogen fluoride catalyst present. While many of the condensation reactions are carried out at substantially atmospheric pressure, it may be desirable in certain instances and with certain reactants to carry out the reaction at pressures up to about 100 atmospheres or more. It is convenient in most instances to operate the equipment utilized at the pressure generated by the reaction mixture and the catalysts contained therein.

Aromatic hydrocarbon derivatives which may be used as starting materials in the process of this invention include aromatic nitro compounds, aromatic sulfonic acids, aromatic amines, phenols, aromatic halogen compounds, aromatic carboxylic acids, aromatic aldehydes and aromatic ketones.

Typical utilizable aromatic nitro compounds include nitrobenzene, ortho-dinitrobenzene, meta-dinitrobenzene, p-dinitrobenzene, 1,3,5-trinitrobenzene, o-nitrotoluene, m-nitrotoluene, p-nitrotoluene, 2,4-dinitrotoluene, 2,4,6-trinitrotoluene, 2,4,6-trinotro-m-xylene, picric acid, 2,4,6-trinitroresorcinol, tetryl, o-nitrochlorobenzene, m-nitrochlorobenzene, p-nitrochlorobenzene, 2,4-dinitrochlorobenzene, picryl chloride, o-nitro-diphenyl, p-nitrodiphenyl, etc. Certain of the reduction products of aromatic nitro compounds are also utilizable in the process of this invention. Such intermediate reduction products include nitrosobenzene, phenyl-hydroxyl amine, azoxybenzene, azobenzene, hydrazobenzene, etc.

Suitable utilizable aromatic sulfonic acids include benzene sulfonic acid, o-tolyl sulfonic acid, m-tolyl sulfonic acid, p-tolyl sulfonic acid, various xylene sulfonic acids, dodecylbenzene sulfonic acids, dodecyl toluene sulfonic acids, etc. Acid chlorides formed by the reaction of aromatic acids with phosphorus halides are also utilizable. The esters, sulfonamides, and chloroamides formed from aromatic sulfonic acids may also be used as well as nitriles, and sulfinic acids.

Utilizable aromatic amines include aniline, methylaniline, dimethylaniline, diethylaniline, o-toluidine, m-toluidine, p-toluidine, o-nitroaniline, m-nitroaniline, p-nitroaniline, 2,4-dinitroaniline, o-phenylene diamine, m-phenylene diamine, p-phenylene diamine, o-anisidine, p-anisidine, p-phenetidine, o-chloroaniline, m-chloroaniline, p-chloroaniline, p-bromoaniline, 2,4,6-trichloroaniline, 2,4,6 - tribromoaniline, diphenylamine, triphenylamine, benzylidine, o-tolidine, o-dianisidine, etc. The acid salts and acetyl derivatives of the various aromatic amines may also be utilized.

Typical utilizable hydroxy aromatic hydrocarbons include phenol, o-cresol, m-cresol, p-cresol, o-chlorophenol, p-chlorophenol, m-chlorophenol, p-bromophenol, 2,4,6-trichlorophenol, 2,4,6-tribromophenol, o-nitrophenol, m-nitrophenol, p-nitrophenol, 2,4-dinitrophenol, guaiacol, anol, eugenol, isoeugenol, saligenin, carvacrol, thymol, o-hydroxyacetophenone, p-hydroxyacetophenone, o-hydroxydiphenyl, p-hydroxydiphenyl, o-cyclohexylphenol, p-cyclohexylphenol, catechol, resorcinol, hydroquinone, pyrogallol, hydroxyhydroquinone, phloroglucinol, o-aminophenol, m-aminophenol, p-aminophenol, etc.

Aromatic halogen compounds utilizable in the scope of this invention include fluorobenzene, chlorobenzene, bromobenzene, iodobenzene, o-chlorotoluene, m-chlorotoluene, p - chlorotoluene, o - bromotoluene, m - bromotoluene, p-bromotoluene, o-bromo-anisole, p-bromo-dimethylaniline, o-dichlorobenzene, p-dichlorobenzene, 1,2,4-trichlorobenzene, 1,2,3,4-tetrachlorobenzene, 1,2,4,5-tetrachlorobenzene, hexachlorobenzene, p-dibromobenzene, o-bromochlorobenzene, p-bromochlorobenzene, o-bromo - iodobenzene, p - bromo - iodobenzene, p - chloro-iodobenzene, etc.

Utilizable aromatic carboxylic acids include benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, 3,5-dinitrobenzoic acid, salicylic acid, m-hydroxybenzoic acid, p-hydroxybenzoic acid, anisic acid, gallic acid, phthalic acid, syringic acid, anthranilic acid, m-aminobenzoic acid, p-aminobenzoic acid, etc. Utilizable derivatives of benzoic acid include methyl benzoate, benzoic anhydride, benzoyl chloride, perbenzoic acid, dibenzoyl peroxide, benzamide, benzanilide, benzhydrazide, etc. Utilizable polybasic acids and derivatives include phthalic acid, phthalic anhydride, isophthalic acid, terphthalic acid, hemimellitic acid, trimellitic acid, trimesic acid, prehnitic acid, mellophanic acid, pyromellitic acid, benzene pentacarboxylic acid, mellitic acid, diphenic acid, etc. Also, benzene derivatives with acidic side chain may be used; for example, phenyl acetic acid, hydrocinnamic acid, omega-phenylbutyric acid, delta-phenyl-n-valeric acid, omega-phenyl-n-caproic acid, cinnamic acid, phenylpropionic acid, homophthalic acid, o-phenylene-diacetic acid, m-phenylenediacetic acid, p-phenylenediacetic acid, o-phenyleneacetic-β-propionic acid, etc.

Utilizable aromatic aldehydes and ketones include benzaldehyde, m-tolualdehyde, p-tolualdehyde, o-chlorobenzaldehyde, p - chlorobenzaldehyde, o - nitrobenzaldehyde, m - nitrobenzaldehyde, p - nitrobenzaldehyde, o-aminobenzaldehyde, p - aminobenzaldehyde, salicylaldehyde, m-hydroxybenzaldehyde, p-hydroxybenzaldehyde, o-methoxybenzaldehyde, anisaldehyde, p-dimethylaminobenzaldehyde, 2,6-dichlorobenzaldehyde, vanillin, acetophenone, propiophenone, benzophenone, fluoroacetophenone, p-dimethylaminobenzophenone, etc.

Carbohydrates which are condensed with hydrocarbons in the process of the present invention include simple sugars, their desoxy and omega-carboxy derivatives, compound sugars, or oligosaccharides, and polysaccharides. Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid unit, i. e., polyuronides, polysaccharides comprised of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceraldehyde and s-dihydroxyacetone; tetroses, such as erythrose, threose, erythrulose, and apiose; the pentoses such as arabinose, xylose, ribose, lyxose, rhamnose (a desoxyhexose), fucose (a desoxyhexose), rhodeose, digitalose, and ketoxylose; the hexoses, such as mannose, glucose, idose, gulose, galactose, talose, allose, altrose, fructose, sorbose, tagatose, and psicose; heptoses such as glucoheptose, mannoheptose, galacto-hextose, sedoheptose, mannoketoheptose, glucoheptulose, and perseulose; octoses such as glucooctose, mannooctose, and galactooctose; nonoses such as gluconose, and mannononose; and decoses such as glucodecose. Desoxy derivatives of simple sugars are formed by the replacement of a hydroxyl substituent in a sugar with hydrogen thereby forming a methyl or methylene linkage. The desoxypentoses and desoxyhexoses are the most commonly occurring of such compounds. The omega-carboxy derivatives of simple sugars, which are suitable in the process of the present invention include tartronic semialdehyde or its tautomer, hydroxypyruvic acid, α, λ-dihydroxyacetoacetic acid, threuronic acid, 4-keto-2,3,5-trihydroxypentanoic acid, xyluronic acid, 5-ketohexanoic acids such as 5-keto-allonic acid, 5-keto-gluconic acid, 5-keto-mannonic acid, 5-ketogulonic acid, and 5-keto-galactonic acid, uronic acids such as glucouronic acid, mannuronic acid and galacturonic acid, and the 6-keto-heptanoic acids. The simple sugars and their omega-carboxy derivatives, as starting materials for the process of this invention, may be represented by the following general formula:

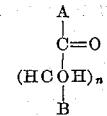

in which A=H and CH₂OH, n=an integer from 1 to about 12 or so, and B=H, CH₂OH, and COOH. As an example of the utility of this general formula when A=H, n=1, and B=H, the compound is glycolaldehyde; when A=H, n=1, and B=CH₂OH, the compound is glyceraldehyde; when A=H, n=1, and B=COOH, the compound is tartaronic semialdehyde, a tautomer of hydroxypyruvic acid; when A=CH₂OH, n=1, and B=H, the compound is s-dihydroxyacetone; when A=CH₂OH, n=1, and B=CH₂OH, the compound is erythrulose; when A=CH₂OH, n=1, and B=COOH, the compound is α,λ-dihydroxyacetoacetic acid; when A=H, n=2, and B=CH₂OH, the compound is erythrose, or threose; when A=H, n=2, and B=COOH, the compound is threuronic acid; when A=CH₂OH, n=2, and B=CH₂OH, the compound is riboketose, or xyloketose; when A=CH₂OH, n=2, and B=COOH, the compound is 4-keto-2,3,5-trihydroxypentanoic acid; when A=H, n=3, and

B=CH₂OH

the compound is ribose, arabinose, xylose, or lyxose; when A=H, n=3, and B=COOH, the compound is xyluronic acid; when A=CH₂OH, n=3, and

B=CH₂OH

the compound is psicose, fructose, sorbose, or tagatose; when A=CH₂OH, n=3, and B=COOH, the compound is 5-ketohexanoic acid; when A=H, n=4, and

B=CH₂OH

the compound is allose, altrose, glucose, mannose, gulose, idose, galactose, or talose; when A=H, n=4, and B=COOH, the compound is a uronic acid; when

A=CH₂OH

n=4, and B=CH₂OH, the compounds are heptoses; and when A=CH₂OH, n=4, and B=COOH, the compounds are 6-ketoheptanoic acids.

The utilizable oligosaccharides or compound sugars include disaccharides such as the pentose-hexose saccharides including glucoapiose, vicianose, and primeverose; the methylpentose-hexose saccharides including glycorhamnoside, and rutinose; and the dihexoses such as turanose, maltose, lactose, cellobiose, gentiobiose, melibiose, sucrose, and trehalose. Other compound sugars are represented by tricaccharides such as the methylpentose-hexose saccharides including rhamninose, and robionose; the trihexose saccharides such as mannotriose; and the trihexoses including raffinose, melezitose, and gentianose. An example of a suitable tetrasaccharide is stachyose.

Various polysaccharides are also utilizable in the process of the present invention. These polysaccharides include pentosans, such as starch, cellulose, glycogen, inulin, mannan, galactan, lichenin, levan, dextran, and laminarin. All of the above polysaccharides are composed of one type of sugar residue. Other polysaccharides which are composed of more than one type of sugar unit such as the pentosans, like araboxylan and the hexosans like galactomannan may be used. Other utilizable polysaccharides are represented by those composed of uronic acid units such as pectic acid and alginic acid; those composed of aldose (pentose or hexose) and uronic acid units such as gum arabic, damson gum, gum tragacanth, linseed mucilage, pectins, and those containing hexose units esterified with an inorganic acid such as certain seaweed polysaccharides like agar.

The hydrogen fluoride catalyst which is used in this process may be used in anhydrous form or diluted with water to make a hydrofluoric acid of the desired concentration. The hydrofluoric acid may also be further diluted with various inert diluents when it is desirable to operate the process of this invention with low hydrogen fluoride concentrations. Suitable inert diluents include perfluoro derivatives of n-paraffinic hydrocarbons such as perfluoropropane, perfluoro-n-butane, perfluoro-n-pentane, perfluoro-n-hexane, etc. Other suitable diluents are apparent to one skilled in the art. For example, cycloparaffins as cyclopentane and cyclohexane may be used. In some instances, hydrofluoric acid of from about 85 to about 100% HF concentration is desirable, and in some other instances it is most desirable to use anhydrous hydrogen fluoride as the catalyst.

This process may be carried out by slowly adding a hydrogen fluoride catalyst to a stirred mixture of hydrocarbon derivative and carbohydrate or related material being subjected to reaction while maintaining the reaction temperature at from about −40° to about 100° C. by suitable cooling and/or heating means. It is often desirable or advisable to commingle the reactants and catalyst at a relatively low temperature such as from about −80° to about −30° C. and then to permit the reaction mixture to warm gradually while the reactants and catalyst are stirred by suitable means such as a motor driven stirrer or other adequate mixing equipment. After the reaction has reached the desired degree of completion, the hydrogen fluoride catalyst is removed from the reaction mixture by distillation at atmospheric or lower pressures, or by passing an inert gas through the reaction mixture while maintaining it at relatively low temperature. Also the entire reaction mixture and catalyst may be mixed with water or may be added to ice in order to quench the activity of the hydrogen fluoride catalyst and permit separation of the organic reaction products and unreacted starting materials from the catalyst. The organic reaction products may also be separated from aqueous hydrogen fluoride by means of an organic solvent such as ether, in which some of the organic material may be dissolved. Further methods of isolating the reaction products are illustrated in the examples. Thus the product formed by reacting 2,4-dimethylphenol with glucose or cellulose in the presence of substantially anhydrous hydrogen fluoride at 30° C., separated into an ether-soluble and water-insoluble product and an ether-insoluble and water-soluble product.

The process of this invention broadly emphasizes the reaction of carbohydrates including simple sugars, their derivatives, compound sugars, and polysaccharides, with aromatic hydrocarbon derivatives such as phenols, anilines, aromatic carboxylic acids, etc., using as a catalyst hydrogen fluoride.

The type of product is markedly affected by the length of time that the reactants are in contact with the hydrogen fluoride catalyst as well as the temperature of the reaction. This time factor will be set forth in greater detail hereinafter in the examples.

The reaction products of this process lead to materials having diversified uses. Some of these are enumerated as follows:

(a) *Detergents.—*
  (1) *Sulfonate type.—*Sulfonation of some of the products lead to compounds of the R—$SO_3H$ type which can be converted into surface active salts. Further, in some instances, compounds may be directly prepared having the R—$SO_3H$ structure.
  (2) *Sulfate type.—*Sulfation of these products lead to compounds of the RO$SO_3H$ type which, if desired, can be converted into salts.
  (3) *Nonionic type.—*The substituted products are water-soluble to different degrees depending upon the size and nature of the substituent. Thus, for example, it is possible to make a series of surface-active agents with increasing hydrophobic-hydrophilic ratio in the molecule by reacting glucose with aromatic hydrocarbon derivatives.
  (4) *Detergent aids.—*The structure of some of the products are related to compounds found useful as detergent aids (that is, compounds which when added to a detergent in small concentrations rather markedly increase their effectiveness). They may accordingly find use in that field.

(b) *Surface coatings and resins.—*Some of the reaction products can be used per se as surface coating materials. Resins can be made by heating many of the reaction products with formaldehyde, urea, phenol, aniline, etc., and combinations of the above-enumerated compounds.

(c) *Explosives.—*Nitration of many of the reaction products will give explosives. These explosives will contain in some instances nitro groups attached to aromatic rings as well as being nitro-alcohol derivatives.

(d) *Fermentation.—*The conversion of many of the reaction products into other useful chemicals such as plastics, etc. can be accomplished by employing the products as a substratum for growing certain species of bacteria. It has been observed that water concentrations of some of these products support the growth of fungi.

(e) *Pharmaceuticals.—*Since many of the products which can be prepared by the present process are either completely new in constitution, or hitherto unavailable in appreciable amounts and combine the chemistry of carbohydrates on one hand, and of the hydrocarbons on the other hand, they open up a completely new field of substances adaptable for use in medicinal chemistry or in general chemical synthesis.

(f) *Gelling agents.—*Various reaction products are effective for gelling paraffinic or aromatic hydrocarbons. Thus, for example, small quantities of one of the reaction products gels benzene, and pentane to a lesser extent.

(g) *Antioxidants.—*Various reaction products are effective in different degrees as antioxidants for such diverse substances as hydrocarbons, edible food products, fermented alcoholic beverages, etc. Some of these antioxidants, as for example, the reaction products of two mols of 2,4-dimethylphenol with glucose, yields a water-soluble antioxidant which may be incorporated into various materials which heretofore have not been able to be stabilized because of lack of this solubility property.

(h) *Plasticizers.—*It is possible to balance the hydrophobic and hydrophilic parts of the molecule, going all the way from water-soluble, hydrophilic materials to hydrophobic acting compounds, wherein the aromatic part predominates over the oxygenated part, thus producing new plasticizing agents.

The nature of this invention is illustrated further by the following examples, which however, should not be misconstrued to limit unduly the generally broad scope of the invention.

EXAMPLE I

This example illustrates the reaction of phenol with cellulose. Cellulose is a polysaccharide containing glucoside linkages and with all but one of the potential aldehyde groups of the glucose residues involved in these glucosides.

As an example of the manner of conducting these experiments, the following detailed description is given: In a one liter steel turbomixer autoclave was sealed 41 grams of cellulose, 60 grams of phenol, and 200 ml. of n-pentane as a diluent. With stirring, the autoclave was then cooled to —78° C. and 224 grams of hydrogen fluoride added. The temperature was allowed to rise to 0° C. and the reactants then contacted at this temperature for 3 hours. Then a stream of nitrogen was passed through the reactor at atmospheric temperature to remove most of the hydrogen fluoride. A substantial amount of hydrogen fluoride remained behind in the reaction mixture, although most of it could have been removed by prolonging the nitrogen purge. The autoclave was opened, the product found to be a heavy fuming brown syrup. This was poured into a silver dish and the net weight of the product recovered here was 134 grams. After two days standing in a hood-draft, the product had solidified to a clear crystalline mass weighing 111 grams. This clear crystalline mass was then mascerated with 300 cc. of water. A cold water-insoluble portion of the reaction product was separated and after drying weighed 19 grams. This was found to consist mainly of a chemical individual corresponding to the following formula:

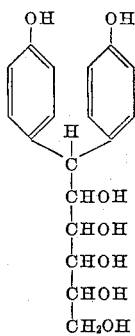

The melting point of this new composition of matter is 174–175° C. Its elementary analysis is: percent carbon, calculated for $C_{18}H_{22}O_7$, 61.7%; found, 61.96%; percent hydrogen, calculated for $C_{18}H_{22}O_7$, 6.33%; found, 6.53%. From a 75% ethanol solution, this product, 1,1-di-p-hydroxyphenyl-1-desoxy-D-glucitol, may be crystallized in the form of fine needle-like crystals.

EXAMPLE II

This experiment was again a demonstration of the reaction of cellulose with phenol, a hydrocarbon derivative. The quantities, and procedure used in this example, are the same as in Example I down through allowing the product to stand in a hood-draft. At this point, in this example, the crude product weighed 116 grams.

To the 116 grams of crude product was added 600 ml. of ether and the mixture allowed to stand overnight. The ether was then decanted off and the residue dissolved in 380 ml. of boiling 95% ethanol. The alcohol solution was filtered while hot, and then allowed to stand at 0° C. The needle-like crystals which formed were filtered off and dried; the dried weight was 20 grams. These crystals melted at 174–175° C. and were the same as the product indentified in Example I as 1,1-di-hydroxyphenyl-1-desoxy-D-glucitol.

The more soluble part of the product is believed to contain a monophenolated glucose corresponding to the following structural formula:

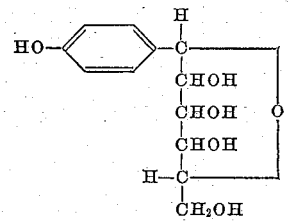

EXAMPLE III

In this example, cellulose was reacted with 2,4-dimethylphenol. The experiment was carried out in a steel turbomixer autoclave as described in Example I, the charge being 64 grams of 2,4-dimethylphenol, 30 grams of cellulose, and 227 grams of hydrogen fluoride. The 2,4-dimethylphenol and cellulose were sealed into the autoclave which was then cooled to —35° C. at which temperature the hydrogen fluoride was added. The temperature of the autoclave was then allowed to rise to 0° C. and was kept there for three hours time during which the mixture was stirred. Then, while continuing the temperature at 0° C. with stirring, a stream of nitrogen was passed through the autoclave for 2.5 hours. The reaction product was washed with several portions of water, then steam distilled to remove unreacted 2,4-dimethylphenol. 16 grams of a volatile oil, assumed to be 2,4-dimethylphenol, was recovered. The hot aqueous solution remaining in the distilling flask was filtered and two grams of tar removed therefrom. The filtrate was cooled to 5° C. and 34 grams of a crystalline material recovered therefrom. This second cold filtrate was later concentrated to give 27 grams of dry product which was found to be the same as the crystalline material recovered above. 33 grams of a crystalline product was dissolved in two liters of boiling water. 20 grams of a crystalline material melting at 151–154° C. was obtained therefrom. This material was recrystallized from 40% ethanol to give a product melting sharply at 155° C. and corresponding to the following structural formula:

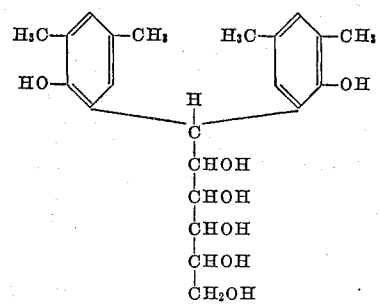

This 1,1-di-(2-hydroxy-3,5-dimethylphenol)-1-desoxy-D-glucitol was analyzed for carbon and hydrogen and its elementary analysis was found to be: percent carbon, calculated for $C_{22}H_{30}O_7$, 65.00%; found, 64.86%; percent hydrogen, calculated for $C_{22}H_{30}O_7$, 7.44%; found, 7.68%. The crystal structure of this product was microscopic rectangular prisms. It was almost insoluble in hot benzene or in ether, and soluble in cold acetone and in ethanol.

It was tested as an antioxidant in lard in which it had some effectiveness in a concentration of 0.01% by weight. Also, although it is very insoluble in gasoline, it raised the induction period of a cracked gasoline from 60 minutes to 145 minutes when added thereto in a concentration of 0.01% by weight. The induction periods were determined by standard accelerated oxygen bomb tests. The composition also exhibited surface-active properties in a concentration of 0.045% as measured by interfacial tension and surface tension measurements.

On the basis of the 2,4-dimethylphenol which reacted, almost exactly two mols was consumed for each mol of cellulose ($C_6H_{10}O_5$) charged. The yield of the dixylenolyl glucitol was above 50% of the theoretical value. The composition is also useful in nonfermented alcoholic beverages as a stabilizer to prevent hazing, which normally occurs due to the action of light on beverages such as beer or wine.

EXAMPLE IV

The condensation products of carbohydrates and aromatic hydrocarbon derivatives as shown in Examples I–III, constitute a new source for certain polyhydroxy compounds. Some new compounds can be produced as illustrated by the reaction of phenolic compounds with carbohydrates. One use of such compounds is to react them with formaldehyde to give new types of resins. Pure 1,1-di-p-hydroxy-phenyl-1-desoxy-D-glucitol from the reaction of phenol with cellulose at 0° C. was available and served as a convenient intermediate on which to work. It was condensed with formalin (36–38% formaldehyde) in the presence of both acidic and basic catalysts. The resins obtained were cured by heating either in an oven or over a steam bath. The cured products were examined for their behavior toward different solvents.

Three grams of 1,1-di-p-hydroxy-phenyl-1-desoxy-D-glucitol, 15 ml. of formalin, and 3 ml. of ammonium hydroxide were placed in a test tube and warmed over a flame for a few minutes. The solution turned from colorless to yellow and was not opaque. The solution was then cooled and became slightly viscous. It was then heated over a steam bath for 30 minutes, during which time it was observed that the solution became very viscous. Further drying and curing was carried out in an electrically heated oven at a temperature of from about 120° to about 170° C. During the heating in the oven for a period of about one hour, the material changed from a yellow clear resin to an opaque yellow-brown brittle material.

In another experiment, 2.5 grams of 1,1-di-p-hydroxyphenyl-1-desoxy-D-glucitol, 5 ml. of formalin, and 3 ml. of 40% sodium hydroxide were placed in a flask and refluxed gently for 30 minutes. The solution became very viscous and was a yellow-brown color. When dried and cured over a steam bath, the final product was brittle and deep amber in color.

In still another experiment, 1,1-di-p-hydroxyphenyl-1-desoxy-D-glucitol (3 grams), formalin (5 ml.), and glacial acetic acid (10 ml.) were placed in a flask and dry HCl bubbled therethrough. The color of the solution became dark after about 30 minutes' time, while still passing HCl therethrough. At this point, the solution was heated and the HCl gas continued while a further 10 ml. of formalin was added. The solution immediately became cloudy and a yellow material separated. When dried and cured, this material was brittle, but softened on heating over a steam bath. The product was found to be insoluble in water and benzene, and soluble in acetone and in glacial acetic acid.

In an experiment similar to the first one described above, three grams of 1,1-di-p-hydroxyphenyl-1-desoxy-D-glucitol, 15 ml. of formalin, and 3 ml. of concentrated ammonium hydroxide, were placed in a test tube and heated in a small flame for a few minutes. The mixture was then heated over a water bath for one hour, transferred to a vacuum desiccator, and allowed to stand for two days. The product was a clear, yellow resin which was not brittle.

The condensation products obtained from aromatic hydrocarbon derivative-carbohydrate compounds with formaldehyde were resinous materials. Depending whether an acidic or basic catalytic is used for the reaction, two different types of material are obtained. With a basic catalyst, the product is curable. With an acidic catalyst, the product is of the noncurable type. The products formed were brittle, but not as brittle as products obtained from phenol and formaldehyde under the same conditions.

EXAMPLE V

In Example IV, the production of new resins by the reaction of an aromatic hydrocarbon derivative-carbohydrate compound with formaldehyde was demonstrated. Resins may also be produced in the absence of formaldehyde by the simple treatment of these new compositions with heat and pressure.

One gram of 1,1-di-p-hydroxy-phenyl-1-desoxy-D-glucitol was placed in a rotating autoclave under 100 atmospheres of nitrogen pressure. The temperature of the autoclave was raised to 200° C. and maintained for six hours. After cooling, a resinous material was withdrawn. This resin was soluble in acetone, ethanol, and insoluble in water, ether, and benzene. If softens at 165–175° C.

EXAMPLE VI

Another use for the compositions produced by the process of the present invention, is to esterify them with nitric acids to give nitrates similar to nitrocellulose. Several experiments were conducted nitrating 1,1-di-p-hydroxyphenyl-1-desoxy-D-glucitol under a variety of conditions. The percent nitrogen content of several of the nitrated products was determined.

Equal volumes of 96% sulfuric acid and 70% nitric acid were mixed together. 75 ml. of this nitrating mixture was poured into a beaker, cooled to wet ice temperature, and 2.5 grams of 1,1-di-p-hydroxyphenyl-1-desoxy-D-glucitol was added thereto. The mixture was stirred for 30 minutes, cooled by the addition of ice, and filtered. 0.6 grams, of a dark amorphous product was obtained after washing.

In another experiment similar to that described above, the 2.5 grams of 1,1-di-p-hydroxyphenyl-1-desoxy-D-glucitol was added slowly to the nitrating mixture while the temperature was maintained below 10° C. 1.9 grams of a yellow colored product containing 9.29% nitrogen was obtained. This corresponds to the introduction of between three and four nitro groups. The theoretical nitrogen content for the esterification by nitric acid of three hydroxyl groups is 8.65% nitrogen. The yield of product obtained was 76%.

In still another experiment, 2.5 grams of 1,1-di-p-hydroxyphenyl-1-desoxy-D-glucitol was dissolved in 37.5 ml. of concentrated nitric acid cooled to 0° C. While being maintained at 0° C., 37.5 ml. of concentrated sulfuric acid was added thereto. A yellow-orange product appeared in the reaction mixture, and after the addition of ice, was removed by filtration to yield 2.4 grams of a material melting from 85–110° C. The nitrogen content of the product was 1.30%, corresponding to 4 or 5 hydroxyl groups of the carbohydrate chain esterified with nitric acid. The theoretical nitrogen content for four hydroxyl groups esterified is 10.05% and for five hydroxyl groups, it is 12.23%.

Still another experiment was carried out in which the initial procedure was the same as the last described experiment above.

After the addition of the concentrated sulfuric acid dropwise, the mixture was allowed to stand for 3 hours at 0° C., then poured on ice and a yellow amorphous solid was recovered. Its dry weight was 2.1 grams. This yellow nitrated product was dissolved in acetone and the solution then spread on a metal sheet. On drying, a yellow, flaky material was recovered.

EXAMPLE VII

In the previous example, the preparation of a nitrated 1,1 - di - p - hydroxyphenyl - 1 - desoxy - D - glucitol containing 11.30% nitrogen was described. 1.5 grams of this nitro derivative, 10 ml. of formalin, and 3 ml. of concentrated ammonium hydroxide were placed in a flask and heated on a water bath. The solution became slightly viscous and deep red in color almost immediately. When this material was exposed to air for a sort time, it became a very viscous resin. The red material was only slightly soluble in acetone. When a sample of the resin was added to water, a yellow amorphous material separated from the solution.

EXAMPLE VIII

Since the previous nitration experiments have demonstrated that nitric acid esters can be prepared, it was of interest to determine whether the acetate esters of 1,1-di-p-hydroxyphenyl - 1 - desoxy - D - glucitol could be nitrated with the introduction of nitro groups to the aromatic nucleus.

One gram of the ester obtained from reacting 1,1-di-p-hydroxy phenyl - 1 - desoxy - D - glucitol with acetic anhydride in the presence of sodium acetate was added to 35 ml. of concentrated nitric acid at 0° C. An equal volume of concentrated sulfuric acid was added dropwise. After standing for three hours at a temperature not exceeding 25° C., the mixture was poured on ice, and a yellow precipitate separated therefrom. This precipitate was recrystallized from normal heptane. The nitrogen content of the product was found to be 8.10%. The product when exposed to the atmosphere for several days underwent decomposition as is evidenced by a change in color from yellow to a yellow-brown. If the product is kept in a vacuum desiccator, decomposition is retarded. Thus the nitration of the completely esterified carbohydrate derivative has been demonstrated.

EXAMPLE IX

This example illustrates the reaction of phenol with alginic acid. Alginic acid is a polysaccharide composed of uronic acid units. This reaction was studied at 0° C. in three different experiments which involved the utilization of hydrogen fluoride as the catalyst. In the first experiment, the contacting was for a period of two hours' time; in the second experiment, the contacting was for a period of four hours' time, while in the third experiment, a reaction time of 16 hours was utilized.

Experiment I

The following reactants were charged to an 1100 ml. turbomixer autoclave; 60 grams of alginic acid, 80 grams of phenol, 200 ml. of n-pentane, and 238 grams of HF. The mixture was contacted for two hours at 0° C. and atmospheric pressure. At the end of the contact time, most of the hydrogen fluoride was flushed from the system by passing a stream of nitrogen through the autoclave. The product, which was transferred to a silver dish, weighed 123 grams after standing overnight in a hood-draft. At this point, the product was a tan-slightly pink viscous syrup.

The product was mascerated with several batches of dry ethyl ether. This changed the product into a gray solid. After drying under vacuum this ether-washed product weighed 61 grams.

A portion of this latter ether-insoluble product (15 grams) was heated to the boiling point of water in 150 ml. of water, and the solution filtered. The insoluble material remaining on the filter after treatment with boiling water, yielded 2.0 grams of a water-insoluble material. The 150 ml. of filtrate, was evaporated to dryness, yielding 10.1 grams of dry residue.

Experiment II

This experiment was conducted in a manner similar to Experiment I, with 60 grams of alginic acid, 80 grams of phenol, 200 ml. of n-pentane, and 236 grams of HF. The reactants were contacted for four hours at 0° C. The product was a cocoa colored paste and after standing overnight in a hood-draft, weighed 146 grams. During an additional four-hour period, another 5 grams of weight was lost, the product at this point weighing 141 grams and probably still containing dissolved hydrogen fluoride which was not removed by the initial nitrogen purge.

A portion of the product (42 grams) was washed with 200 ml. of cold water. On filtration, 2.1 grams of a dry water-insoluble residue was obtained. The filtrate was extracted twice with 200 ml. of ethyl ether and the ether evaporated to leave a residue of 4.7 grams. The remaining aqueous filtrate was evaporated to reduce its volume. When a part of the solution was evaporated on a glass microscope slide, and the slide examined, hexagonal prisms were observed. A portion of the concentrated filtrate was evaporated on a steam bath. Seven grams of a pink solid, designated Product I, was obtained. On evaporation of the remainder of the filtrate, another 10 grams of residue was separated.

After removal of the 42 gram portion hereinabove mentioned from the reaction product in the silver dish, it weighed 99 grams. On further standing, its weight changed to 91 grams. This 91 grams was treated with 500 ml. of cold water, filtered, and the filtrate extracted three times with 300 ml. of ether. On evaporation of the ether, 13.4 grams of dry product was obtained. The water-insoluble material weighed 4.7 grams. The aqueous filtrate on evaporation yielded 50 grams of product. Thus, by separating the reaction product according to its behavior towards different solvents, 6.8 grams of water-insoluble product was obtained, 65.5 grams of water-soluble product, and 18.1 grams of ether extract. Removal of unreacted phenol from the ether extract resulted in a separation of 8.9 grams of a reaction product, designated as Product II.

The neutralization equivalent of Product I is found to be approximately 200. The neutralization equivalent of Product II is found to be approximately 345.

Experiment III

In this experiment, 60 grams of alginic acid, 80 grams of phenol, 200 ml. of n-pentane, and 223 grams of HF were contacted for 16 hours at 0° C. The product after standing overnight weighed 127 grams. The entire product was washed with water, and the solution filtered. The filtrate after standing in the hood-draft was concentrated to 132 grams. After dilution to 400 ml. of water, it was extracted twice with ether. On evaporation of the ether, 17 grams of dry residue was obtained. Concentration of the ether washed water solution yielded 69 grams of dry residue, designated Product III.

The 17 grams obtained by ether extractions were steam-distilled and the residue filtered and dried; final weight, 11 grams.

20 grams of Product III was dissolved in 70 grams of water. A portion of this water solution after evaporation on a glass slide showed the presence of slender prisms under a microscope. The total solution was concentrated under vacuum to yield 19.8 grams of dry residue. Analysis of this residue showed that it contained 1.53% fluorine, 56.08% carbon, and 5.56% hydrogen. It also had an ash content of 1.90%.

The neutralization equivalent of Product III was found to be approximately 300. Material having surface-active properties was prepared from Product III by dissolving 16 grams of Product III in 471 ml. of 0.1 N sodium hydroxide solution. The solution was concentrated to 150 ml., then extracted twice with ether, and the water solution evaporated to dryness. 16.1 grams of a dry residue having surface-active properties was obtained.

In each of the three experiments mentioned above, the crude reaction product showed the presence of a crystalline material, usually hexagonal prisms, upon microscopic examination. A definite trend towards a larger recovery of products with longer contact times was observed in these three experiments. Also, the water soluble portion of the product becomes greater with longer contact times.

EXAMPLE X

The possibility of utilizing carbohydrate derivatives of phenols in the production of high polymeric materials was demonstrated above in Example IV. This example illustrates the reaction of the condensation product of alginic acid and phenol with formaldehyde in the presence of various catalysts. The condensation product produced from alginic acid and phenol in the presence of hydrogen fluoride has not been isolated in a pure form; therefore, various fractions of the crude product in varying degrees of purity were utilized. These fractions were condensed with formalin, 36–38% formaldehyde. Both acidic and basic catalysts were used. In some of the experiments, the resins were cured in an oven or over a steam bath. Also, the solubility of some of the products in various solvents was examined.

Experiment I

The following reagents were mixed together in a test tube:

Alginic acid-phenol derivative [a]_____g__ 1
Formalin _____cc__ 5
NH4OH (concentrated)_____cc__ 1

[a] The alginic acid-phenol derivative utilized in this experiment is described in Example IX, Experiment I, as the 10.1 grams of dry residue which is ether-insoluble and water-soluble.

The resulting solution was transferred to an evaporating dish and the dish and its contents heated over steam. The residue remaining in the dish was a red-brown colored material. The product was found to be soluble in water, but insoluble in alcohol, acetone, ether, and benzene. The material was somewhat brittle.

Experiment II

The following reagents were mixed together in a test tube:

Alginic acid-phenol derivative [a]_____g__ 1
Formalin _____cc__ 5
NH4OH (concentrated)_____cc__ 1

[a] See Experiment I above.

The solution was transferred to an evaporating dish and the dish and contents placed in a desiccator and allowed to stand over 3 days. The dish and its contents were then baked in an oven for three hours. The product was found to be soluble in water, but insoluble in ether, alcohol, benzene, and acetone. The material was dark red-brown in color.

Experiment III

The following reagents were mixed in a test tube:

Alginic acid-phenol derivative [a]_____g__ 1
Formalin _____cc__ 5

[a] See Experiment I above.

Dry ammonia gas was bubbled through the solution. The solution became dark red-brown in color. It was transferred to an evaporating dish at this point. As the mixture was allowed to evaporate, it became very resinous.

Experiment IV

The following reagents were placed in a test tube:

Alginic acid-phenol derivative [a]_____g__ 1
Formalin _____cc__ 4
Acetic acid_____ Excess

[a] See Experiment I above.

Dry hydrogen chloride was bubbled through the solution in a test tube. The solution became quite hot and turned a deep yellow color. It was then transferred to an evaporating dish and baked in an oven at 80–90° C. for several hours. The residue in the dish was a dark colored resinous material. It was not soluble in water, but dissolved readily in acetone.

Experiment V

The following reagents were mixed in a test tube:

Alginic acid-phenol derivative [b]_____g__ 1
Formalin _____cc__ 4
Acetic acid_____cc__ 5

[b] The alginic acid-phenol derivative in this experiment is described in Example IX, Experiment II as the 7 grams of pink solid, designated Product I, plus the 10 grams of residue, both of which are water soluble and ether insoluble.

Hydrogen chloride gas was bubbled through the above solution. It became very hot and turned a very dark red-brown color. When diluted with water, an amorphous white colored precipitate separated from solution.

Experiment VI

The following reagents were mixed in a test tube:

Alginic acid-phenol derivative [c]_____g__ 1
Formalin _____cc__ 4
Acetic acid_____cc__ 5

[c] The alginic acid-phenol derivative used in this experiment is described in Example IX, Experiment III as the 11 grams of dry residue which is obtained after steam distillation of 17 grams of ether-soluble, water-insoluble material.

Hydrogen chloride gas was bubbled through the solution. The solution became hot and then cloudy. A resinous precipitate separated from solution. This brittle resin was insoluble in water and alcohol, but soluble in acetone.

Experiment VII

The following reagents were mixed in a test tube:

Alginic acid-phenol derivative [c]_____g__ 1
Formalin _____cc__ 5

[c] See Experiment VI above.

Ammonia gas was bubbled through the solution. The solution became hot and darker in color. After being transferred to an evaporating dish and baked in an oven overnight at 80° C., the resulting product was a brittle resin. This resin was insoluble in water, acetone, ethyl alcohol, and ether.

The experiments described above amply demonstrate that resinous materials may be produced from alginic acid-phenol condensation products and formaldehyde. While in some of the experiments no actual resin was originally produced, viscous solutions were obtained which upon baking in an oven or evaporation resulted in resins. In one experiment (V), a resinous precipitate separated from solution similar to the way in which phenol-formaldehyde resins separate. This experiment alone demonstrates most clearly that high polymeric materials can be produced from alginic acid-phenol condensation products and formaldehyde. The resinous materials obtained from alginic acid-phenol condensation products and formaldehyde showed very unique solubility relationships with various solvents. For example, in some cases, a water-soluble resin was produced, while in others a water-insoluble resin was produced. Also, both acetone-soluble and acetone-insoluble resins were produced. These unique solubility properties will enhance the utility of the materials.

I claim as my invention:

1. A process which comprises reacting a phenol with a carbohydrate selected from the group consisting of monosaccharides, their desoxy- and their omega-carboxy-derivatives, oligosaccharides, and polysaccharides, in the presence of a hydrogen fluoride catalyst at a temperature of from about −40° C. to about 100° C. to produce a compound selected from the group consisting of hydroxyaryl-desoxy-alditols and hydroxy-aryl-desoxy-ketitols, and recovering said compound.

2. The process of claim 1 further characterized in that said carbohydrate is a monosaccharide.

3. The process of claim 1 further characterized in that said carbohydrate is an oligosaccharide.

4. The process of claim 1 further characterized in that said carbohydrate is a polysaccharide.

5. A process which comprises reacting a phenol with cellulose at a temperature of from about −10° to about 50° C. and in the presence of a hydrogen fluoride catalyst to produce a hydroxy-phenyl-desoxy-alditol, and recovering the last-named compound.

6. A process which comprises reacting an alkylphenol with cellulose at a temperature of from about −10° to about 50° C. and in the presence of a hydrogen fluoride catalyst to produce a hydroxy-alkylphenyl-desoxy-alditol, and recovering the last-named compound.

7. A process which comprises reacting phenol with cellulose at a temperature of from about −10° to about 50° C. and in the presence of a hydrogen fluoride catalyst to produce 1-p-hydroxyphenyl-1-desoxy-glucitol and 1,1-di-p-hydroxyphenyl-1-desoxy-glucitol and recovering the resultant products.

8. A process which comprises reacting 2,4-dimethylphenol with cellulose at a temperature of from about −10° to about 50° C. and in the presence of a hydrogen fluoride catalyst to produce 1-(2-hydroxy-3,5-dimethylphenyl)-1-desoxy-glucitol and 1,1-di-(2-hydroxy-3,5-dimethylphenyl)-1-desoxy-glucitol, and recovering the resultant products.

9. A process which comprises reacting phenol with alginic acid at a temperature of from about −10° to about 50° C. and in the presence of a hydrogen fluoride catalyst to produce 1-p-hydroxyphenyl-1-desoxy-glucuronic acid and 1,1-p-hydroxyphenyl-1-desoxy-glucuronic acid, and recovering the resultant reaction products.

10. Di-hydroxyphenyl-1-desoxy-alditol.

11. Di-hydroxyphenyl-1-desoxy-glucitol.

12. 1,1-di-(4-hydroxyphenyl)-1-desoxy-glucitol.

13. 1,1-di-(2-hydroxy-3,5-dimethylphenyl) - 1 - desoxyglucitol.

References Cited in the file of this patent

UNITED STATES PATENTS

| | | |
|---|---|---|
| 2,252,725 | Niederl | Aug. 19, 1941 |
| 2,379,368 | Matuszak | June 26, 1945 |
| 2,400,520 | Kuhn | May 21, 1946 |
| 2,404,340 | Zimmerman | July 16, 1946 |
| 2,460,803 | Bonner | Feb. 8, 1949 |
| 2,472,276 | Bonner | June 7, 1949 |

OTHER REFERENCES

Simons: Ind. & Eng. Chem. (v. 32), pp. 178–183 (1940).